US007555550B2

(12) United States Patent  (10) Patent No.: US 7,555,550 B2
Schunemann  (45) Date of Patent: *Jun. 30, 2009

(54) ASSET TRACKER FOR IDENTIFYING USER OF CURRENT INTERNET PROTOCOL ADDRESSES WITHIN AN ORGANIZATION'S COMMUNICATIONS NETWORK

(75) Inventor: Alan J. Schunemann, Annapolis, MD (US)

(73) Assignee: eTelemetry, Annapolis, MD (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/470,871

(22) Filed: Sep. 7, 2006

(65) Prior Publication Data

US 2007/0288579 A1  Dec. 13, 2007

Related U.S. Application Data

(63) Continuation of application No. 10/627,672, filed on Jul. 28, 2003, now Pat. No. 7,133,916.

(51) Int. Cl.
*G06F 15/173* (2006.01)
*G06F 15/16* (2006.01)
*H04L 9/00* (2006.01)

(52) U.S. Cl. .................. 709/224; 709/206; 709/229; 726/4

(58) Field of Classification Search .............. None
See application file for complete search history.

(56) References Cited

U.S. PATENT DOCUMENTS 5,712,979 A  1/1998  Graber et al.
5,794,235 A  8/1998  Chess
5,944,787 A  8/1999  Zoken
5,948,061 A  9/1999  Merriman et al.
6,044,376 A  3/2000  Kurtzman, II
6,138,162 A  10/2000  Pistriotto et al.
6,185,184 B1  2/2001  Mattaway et al.
6,405,251 B1  6/2002  Bullard et al.
6,442,577 B1  8/2002  Britton et al.
6,516,311 B1  2/2003  Yacoby et al.
6,594,763 B1 * 7/2003  Madoukh ................ 726/1

(Continued)

FOREIGN PATENT DOCUMENTS

EP  1054529  11/2000
WO  WO 98/40994  9/1998
WO  WO 02/03213  1/2002
WO  WO 02/075479  9/2002

OTHER PUBLICATIONS

Kovacich G L: "Netspionage—Part III: The Black Zone, Who Uses Netspionage, How and Why", Computer & Security Elsevier Science Publishers, Amsterdam, NL, vol. 19 No. 6, Oct. 1, 2000, pp. 505-519.

(Continued)

*Primary Examiner*—Wen-Tai Lin
(74) *Attorney, Agent, or Firm*—DLA Piper LLP US

(57) ABSTRACT

A network attached apparatus, system, method and computer program product for identifying users of networked computers is provided. The apparatus is installed at core network uplink points and analyzes packets as they traverse the network and intelligently correlates the contents of the traffic with user contact and system access information. The resulting information is used to identify the user of the networked computer for security or accounting purposes.

16 Claims, 7 Drawing Sheets

U.S. PATENT DOCUMENTS

| | | | |
|---|---|---|---|
| 6,804,659 B1 | 10/2004 | Graham et al. | |
| 6,847,969 B1 | 1/2005 | Mathai et al. | |
| 6,850,892 B1 | 2/2005 | Shaw | |
| 6,862,594 B1 | 3/2005 | Saulpaugh et al. | |
| 6,912,230 B1 | 6/2005 | Salkini et al. | |
| 6,947,598 B2 | 9/2005 | Yogeshwar et al. | |
| 6,970,871 B1 | 11/2005 | Rayburn | |
| 6,978,470 B2 | 12/2005 | Swix et al. | |
| 6,983,379 B1 | 1/2006 | Spalink et al. | |
| 7,000,015 B2 | 2/2006 | Moore et al. | |
| 7,010,492 B1 | 3/2006 | Bassett et al. | |
| 7,035,468 B2 | 4/2006 | Yogeshwar et al. | |
| 7,076,244 B2 | 7/2006 | Lazaridis et al. | |
| 7,089,194 B1 | 8/2006 | Berstis et al. | |
| 7,092,943 B2 | 8/2006 | Roese et al. | |
| 7,110,664 B2 | 9/2006 | Yogeshwar et al. | |
| 7,124,093 B1 | 10/2006 | Graham et al. | |
| 7,133,916 B2 | 11/2006 | Schunemman | |
| 7,320,070 B2 | 1/2008 | Baum | |
| 2002/0169873 A1 | 11/2002 | Zodnik | |
| 2002/0178370 A1 | 11/2002 | Gurevich et al. | |
| 2002/0178382 A1 | 11/2002 | Mukai et al. | |
| 2003/0037163 A1* | 2/2003 | Kitada et al. | 709/236 |
| 2003/0158855 A1 | 8/2003 | Farnham et al. | |
| 2003/0172167 A1 | 9/2003 | Judge et al. | |
| 2003/0200272 A1 | 10/2003 | Campise et al. | |
| 2003/0216143 A1 | 11/2003 | Roese et al. | |
| 2003/0216144 A1 | 11/2003 | Roese et al. | |
| 2003/0217122 A1 | 11/2003 | Roese et al. | |
| 2003/0225893 A1 | 12/2003 | Roese et al. | |
| 2003/0237002 A1* | 12/2003 | Oishi et al. | 713/201 |
| 2004/0057425 A1 | 3/2004 | Brouwer et al. | |
| 2004/0133641 A1 | 7/2004 | McKinnon et al. | |
| 2005/0002380 A1 | 1/2005 | Miller et al. | |
| 2005/0027593 A1 | 2/2005 | Wilson | |
| 2005/0030955 A1 | 2/2005 | Galin et al. | |
| 2005/0050027 A1 | 3/2005 | Yeh et al. | |
| 2005/0125289 A1 | 6/2005 | Beyda et al. | |
| 2005/0166233 A1 | 7/2005 | Beyda et al. | |
| 2005/0232164 A1 | 10/2005 | Anzarouth et al. | |
| 2006/0056388 A1 | 3/2006 | Livingood | |
| 2006/0265283 A1 | 11/2006 | Gorodyansky | |
| 2006/0265501 A1 | 11/2006 | Gorodyansky | |
| 2006/0293962 A1 | 12/2006 | Malobrodsky et al. | |
| 2007/0005654 A1 | 1/2007 | Schachar et al. | |
| 2007/0162598 A1 | 7/2007 | Gorodyansky et al. | |
| 2007/0162954 A1 | 7/2007 | Pela | |
| 2007/0166013 A1 | 7/2007 | Yogeshwar et al. | |
| 2008/0262996 A1 | 10/2008 | Yogeshwar et al. | |

OTHER PUBLICATIONS

European Search Report issued in 04757328.2 dated May 9, 2008.
Non-Final Office Action issued in Application No. 11/283,047 mailed Jun. 20, 2008.
Non-Final Office Action issued in Application No. 11/283,046 mailed Aug. 5, 2008.
International Search Report issued in Application No. PCT/US08/061982 mailed Aug. 20, 2008.
Written Opinion issued in Application No. PCT/US08/061982 mailed Aug. 20, 2008.
Office Action issued in European Application No. 04 757 328.2, mailed Aug. 28, 2008.
Office Action dated Mar. 17, 2005 in related U.S. Appl. No. 10/627,672.
Notice of Allowance dated Jun. 8, 2006 in related U.S. Appl. No. 10/627,672.
International Search Report issued in International Application No. PCT/US04/24186, mailed May 23, 2005.
Written Opinion issued in International Application No. PCT/US04/24186, mailed May 23, 2005.
International Preliminary Report on Patentability issued in International Application No. PCT/US04/24186, mailed Oct. 3, 2005.
"Google to Offer Free Ad-Supported WiFI", http://www.gearlive.com.index.php.news/article/google_to_offer_ad_supported_wifi_08 . . . , Aug. 15, 2005.
Office Action dated Aug. 31, 2005 in related U.S. Appl. No. 10/627,672.
Office Action dated Jan. 18, 2006 in related U.S. Appl. No. 10/627,672.
Final Office Action issued in U.S. Appl. No. 11/283,047 mailed Mar. 30, 2009.
Office Action issued in U.S. Appl. No. 11/283,046 mailed Apr. 16, 2009.

* cited by examiner

ASSET TRACKER FOR IDENTIFYING USER OF CURRENT INTERNET PROTOCOL ADDRESSES WITHIN AN ORGANIZATION'S COMMUNICATIONS NETWORK

CROSS REFERENCE TO RELATED APPLICATIONS

This application is a continuation of U.S. application Ser. No. 10/627,672, filed on Jul. 28, 2003, which issued on Nov. 7, 2006 as U.S. Pat. No. 7,133,916. The entire contents of Ser. No. 10/627,672 are incorporated herein by reference.

BACKGROUND OF THE INVENTION

1. Field of the Invention

The present invention generally relates to computer networks, and more particularly to apparatus, systems, methods and computer program products that provide security within such computer networks.

2. Related Art

In today's technological climate it is typical for an enterprise (i.e., a business concern, corporation, institution, organization, government agency of the like) to own and operate one or more computer networks (e.g., local are networks (LANs) and the like). These computer networks may be spread out over several offices, floors and/or buildings. Within these computer networks are large amounts of sensitive, proprietary (and sometimes, confidential) data. Thus, it is understandable that such enterprises are concerned with the security of their computer networks.

Regardless of the implementation of login/password schemes, unauthorized users inevitably obtain access to computer networks. In fact, even those users to whom access of computer networks are authorized (e.g., employees, independent contractors, sub-contractors and the like), may often use such networks in an unauthorized manner. Further, a great deal of unauthorized activity centers around electronic mail ("e-mail"). For example, an unauthorized user, or an authorized persons or unauthorized manner, may send an enterprise's confidential data to unauthorized persons or unauthorized computer systems via the world-wide, public Internet using e-mail.

Given the above-describes problem, what is needed is an apparatus, system, method and computer program product for identifying users of networked computers. Today, the problem is typically solved by first referring to any existing cable plant documentation (if available) or physically tracing the cable to a physical location. Then, security or IT personnel must arrive at the physical location in order to physically identifying the offending user. The needed apparatus, system, method and computer program product, however, should analyze network e-mail traffic and map Internet Protocol (IP) addresses to end users (i.e., identify the user of a specific IP address within the network). The needed apparatus, system, method and computer program product would result in lowered response time for identifying, locating and disabling computers that pose a security threat.

SUMMARY OF THE INVENTION

The present invention meets the above identified needs by providing an apparatus, system, method and computer program product for identifying users of networked computers. That is, in an embodiment, the present invention provides a network asset tracking system that maps end users to workstation Internet Protocol (IP) addresses by passively analyzing (existing) network traffic. The network asset tracking system of the present invention also provides, in an embodiment, a reporting of end user-to-IP address mappings via a database-backed Web application.

In an embodiment, the network asset tracking system of the present invention includes two components—a name discovery system "back end" and an administrative Web application "front end." The name discovery system ("NDS") is a "sniffer" apparatus (i.e., hardware) connected to the primary switch of the enterprise's LAN. The NDS apparatus captures and analyzes network traffic. The Web application is provided for administrators of the computer network to manage and correlate the data captured by the NDS and cross-correlates such data with the enterprise's directory data to map IP addresses to end users.

An advantage of the present invention is that allows users of computers that pose a security threat to be identified with lowered response time for locating and disabling the suspect computer.

Another advantage of the present invention is that it maps a computer user's identity to an organization's directory information (e.g., building, room, phone, etc.), allowing the physical location of a computer to be determined (i.e., identifying a specific building and/or room). Thus, security threats addressed by the present invention not only include those by unauthorize users, but also Trojan horse-type attacks where physically locating such attacks are critical.

Another advantage of the present invention is that it provides identification of computer users who are using a computer network's assets inappropriately and it can also identify computer users and their organization within a company for Information Technology (IT) infrastructure accounting purposes. This advantage becomes clearer when considering the accounting problem faced by large enterprises who share a large common network infrastructure, yet attempt to allocate the costs of network maintenance and support to separate divisions or departments.

Yet another advantage of the present invention is that it can identify errors in existing cable plant (network) documentation. By providing the physical location of a network connection, combined with the IP address on the switch port in the network closet, the present invention enables documenting the last "hop" and auditing of such existing network documentation.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings.

DETAILED DESCRIPTION

I. Overview

The present invention is directed to an apparatus, system, method and computer program product for identifying users of networked computers.

In an embodiment, the present invention is provided to an enterprise as a solution for mapping Internet Protocol (IP) addressed to an organization's personnel using directory data an the contents of network traffic. First, the enterprise's local area network (e.g., Ethernet, FDDI or the like) traffic is captured and analyzed by installing a name discovery system apparatus (i.e., "NDS" hardware) on the primary switch of the enterprise's local area network (LAN). The captured data is cross-correlated with list data to map IP addresses to end users. Second, the network asset tracking solution of the present invention also provides access and manipulation of the collected network traffic data through a database-backed Web application for use by the enterprise's IT administrative personnel.

The apparatus, system, method and computer program of the present invention allow users of computers that pose a security threat to be identified with lowered response time for location and disabling the suspect computer. Further, the present invention also allows an enterprise to perform accounting functions. For example, an enterprise may be interested in determining the network usage (e.g., number of network connections) for a subset of computer users (e.g., sub-contractors versus employees) for billing and other accounting purposes (e.g., shared/allocated network infrastructure cost models employed by certain enterprises such as government agencies).

The present invention is now described in detail below in terms of the above examples. This is for convenience only and is not intended to limit the application of the present invention. In fact, after reading the following description, it will be apparent to one skilled in the relevant art(s) how to implement the following invention in alternative embodiments (e.g., the analysis of different types of network traffic within different types of computer networks).

The terms "user," "entity," "personnel," "staff," "organization," "enterprise" and the plural form of these terms are used interchangeably throughout herein to refer to those who would access, use, be identified by and/or benefit from the tool that the present invention provides for identifying users of networked computers.

II. Apparatus and System Architecture

Figure 1:
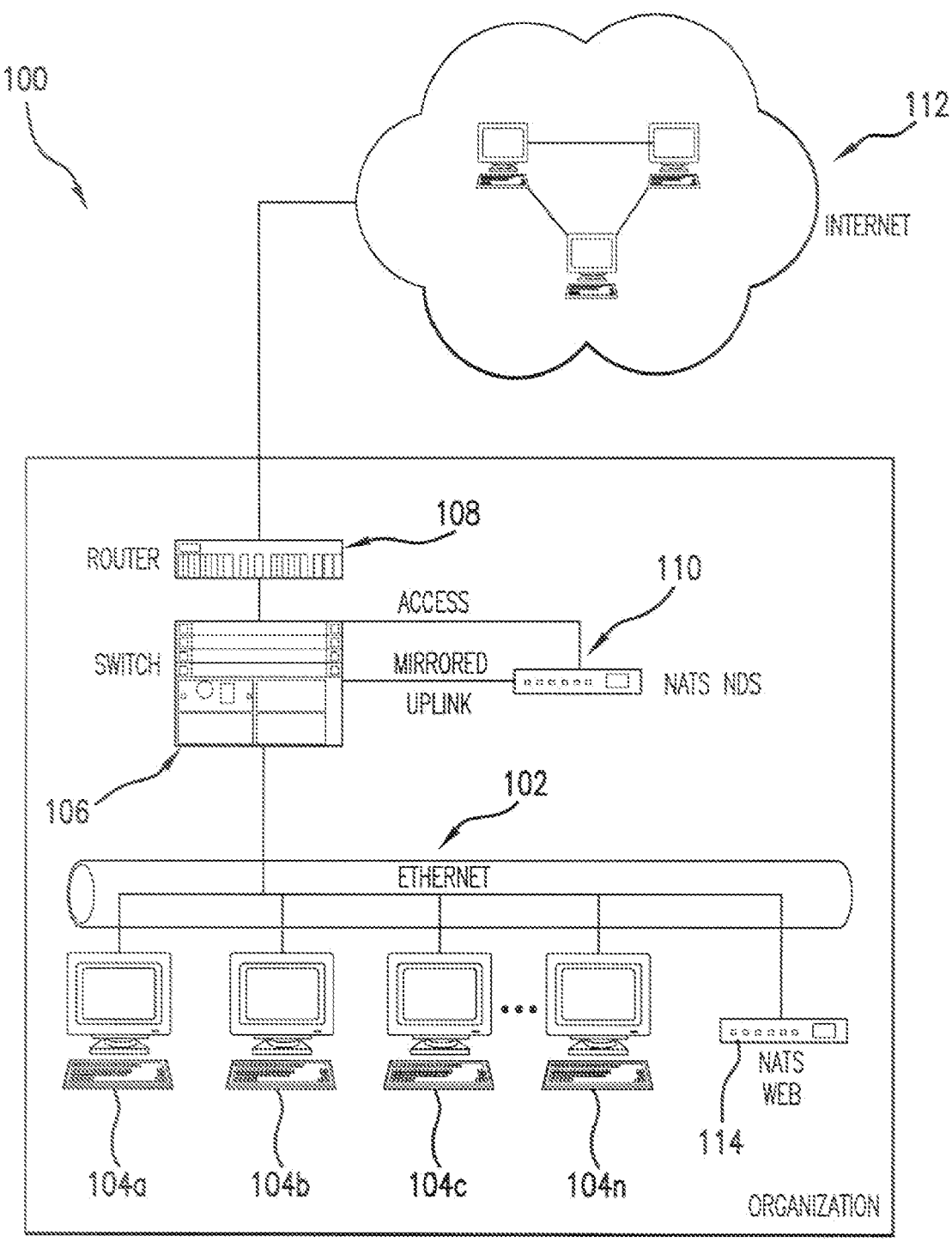
FIG. 1 is a block diagram illustrating an enterprise's local area computer network in which the present invention may be implemented according to one embodiment.

Referring to FIG. 1, a network asset tracking ("NAT") system 100 according to an embodiment of the present invention is shown.

System 100 includes an enterprise's local area network (e.g., Ethernet) backbone 102 which interconnects a plurality of end-user computers 104. In alternate embodiments, computers 104 are terminals, workstations (e.g., Sun.®™, SPARC.™, or NT.™, XP.™, or IBM.®™, AIX.™, operating system) or personal computers (PC) (e.g., an IBM.™, or compatible PC running the Microsoft.®™. Windows 95/98.™, or Windows NT.™, operating system, Macintosh.®™, computer running the Mac.®™, OS operating system, or the like). (For simplicity, FIG. 1 shows computers 104a-n). In alternative embodiments, users may access LAN 102 using any processing device 104 including, but not limited to, a desktop computer, laptop, palmtop, set-top box, personal digital assistant (PDA) and the like.

The backbone of LAN 102 is connected to a primary switch (i.e., the LAN's primary Internet link) 106. Switch 106 is connected to a router 108 which in turn provides users of computers 104 with a connection to the public, global Internet 112.

In an embodiment, a name discovery system ("NDS") apparatus 110 is connected to primary switch 106. NDS 110 functions as a "sniffer" hardware (i.e., a collection node) for capturing LAN 102 inbound and outbound traffic.

In one embodiment, NDS 110 is a one rack unit (1 U)box with a power plug. In such an embodiment, NDS 110 has two 100 Mbps network connections to primary switch 106. As shown in FIG. 1, one link is a mirrored uplink, via one NDS 110 port to collect data from LAN 102. A second NDS 110 port is utilized for sending periodic data files and permitting regular access via a Web application. As will be appreciated by one skilled in the relevant art(s) after reading the description herein, in such an embodiment, NDS 110 requires two valid IP addresses. As will also be appreciated by those skilled in the relevant art(s) after reading the description herein, for larger networks, an NDS 110 can be installed at each core network uplink point (i.e., primary switch) in an alternate embodiment.

In an embodiment, administrators of LAN 102 are given access to NDS 110 via a "front end" Web application which includes a login/password scheme. Such a front end is provided by Web server computer 114 having LAN 102 connectivity to NDS 110. As will be appreciated by one skilled in the relevant art(s), Web server 114 provides the "front-end" for NAT system 100. That is, server 114 contains a Web server process which sends out Web pages in response to Hypertext Transfer Protocol (HTTP) or Hypertext Transfer Protocol (HTTPS) requests from remote browsers (e.g., administrators of LAN 102). More specifically, it provides graphical user interface (GUI) "front-end" screens to such administrative users of NAT system 100 in the form of Web pages. The Web pages, when sent to the users' respective computers 104, result in GUI screens begin displayed.

In an alternate embodiment, administrators of LAN 102 are also given remote access to NDS 110 via the Secure Shell (SSH) program on port 22 of the NDS 110.

As will also be appreciated by one skilled in the relevant art(s) after reading the description herein, in alternate embodiments, NDS 110 would contain, or have access to within NATS system 100, a central repository for storing all LAN 102 traffic data collected. Such a repository would also be accessible to the "front end" Web application to allow administrators of LAN 102 to collect statistics, view reports and the like.

More detailed descriptions of NAT system 100 components, as well their functionality, are provided below.

III. Operation

Figure 2:
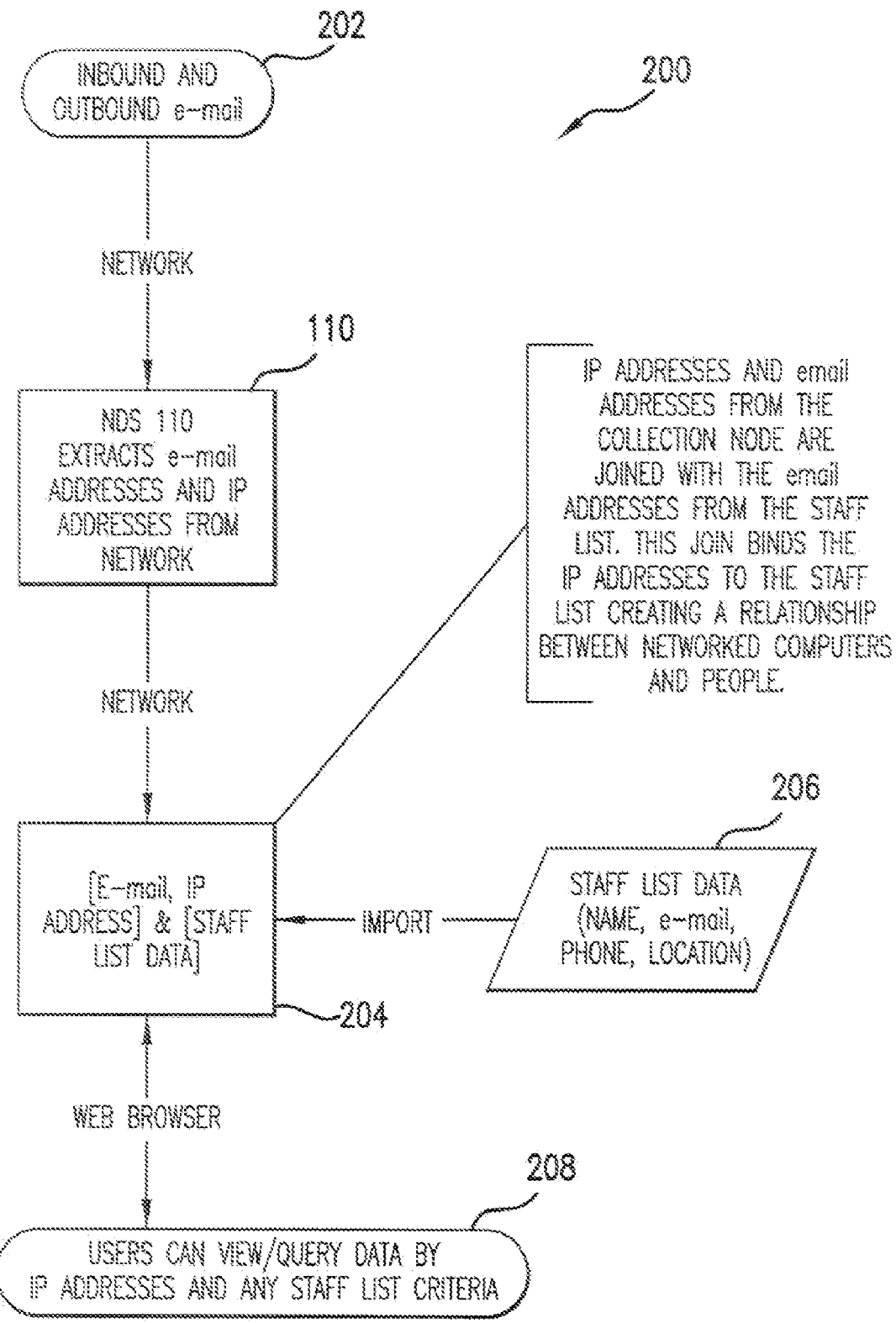
FIGS. 2 and 3A-D are flowcharts illustrating network asset tracking processes according to alternate embodiments of the present invention.

Referring to FIG. 2, a flowchart illustrating the data flow of network asset tracking process 200 according to an embodiment of the present invention is shown.

First, inbound and outbound e-mail traffic data 202 (e.g., IP addresses and e-mail addresses) within LAN 102 are collected (i.e., extracted) and stored by NDS 110. In an embodiment, the Tethereal ("dump and analyze network traffic") network protocol analyzer utility (developed as open source for Unix and Windows and available under the GNU General Public License) is used by NDS 110 to extract data from LAN 102. In alternate embodiments, as will be appreciated by those skilled in the relevant art(s) after reading the description herein, other widely-available utilities (such as Snoop, Tcpdump or the like, or custom code logic) may be used by NDS 110 to extract data from LAN 102.

Next, Web server computer 114 (providing the above-mentioned databased-backed Web application), having LAN 102 connectivity to NDS 110 would join the NDS 110 users of computers 104 within LAN 102 (i.e., map users to IP addresses). More specifically, server 114 provides GUI 208 "front-end" screens to such administrative users of NAT system 100 in the form of Web pages. These Web pages, when sent to the users' respective computers, result in GUI screens 208 being displayed.

In an embodiment, the enterprise's personnel directory information 206 is organized as an ITU-T X.500 or other formatted database containing data about the enterprise's personnel (i.e., those authorized to use computers 104 within LAB 102). In an embodiment, such a database is a comma or tab delimited text file containing the exemplary fields listed in Table 1.

1TABLE 1 Enterprise Personnel Directory 206 Example Fields First Name Last Name Middle Initial Nick Names Name Aliases Building Room Permanent E-mail Temporary E-mail User Name E-mail Address Affiliation/Organization In an embodiment, NAT system 100 would generate, on a periodic time interval basis (e.g., hourly, daily, weekly, etc.), an output data file containing all LAN 102 traffic data collected. In such an embodiment, the processing of data within NAT system 100 creates a text data file that is comma delimited for easy importing into other software application products (e.g., Microsoft.®™, Excel and the like). In alternate embodiments, the NAT system 100 output data file contains a subset or all of the exemplary fields listed in Table 2:

2TABLE 2 Example NAT Output File Fields IP address Hostname First Name Middle Initial Last Name E-mail Address Location Phone Number In an embodiment, the Web application GUI screens 208 provide the capability of sorting the tabular results on any returned field from Table 2. As will be appreciated by one skilled in the relevant art(s) after reading the description herein, the fields from Table 2 that can actually be presented in NAT system 100 output data files, and the resulting mapping of users to IP addresses, is dependent on the quality of the data found within the enterprise's personnel directory 206. As will also be appreciated by one skilled in the relevant art(s) after reading the description herein, Table 1 and Table 2 can be joined together using the E-mail Address field common to both tables.

It should be understood that FIG. 2, which highlights the functionality and other advantages of NAT system 100, is presented for example purposes only. The architecture of the present invention is sufficiently flexible and configurable such that data collection and processing within NAT system 100 may take place in ways other than that shown in FIG. 2 (e.g., one or more data processing functions shown to take place on Web server 114 may take place on NDS 110 and vice versa).

VI. NDS Data Extraction

In an embodiment, NDS 110 is able to extract e-mail addresses and IP addresses from LAN 102 traffic data by analyzing port 25 of switch 106 for Simple Mail Transfer Protocol (SMTP) data, port 110 of switch 106 for Post Office Protocol, version 3 (POP3) data and port 143 of switch 106 for Internet Message Access Protocol, version 4 (IMAP) data.

Figure 3A:
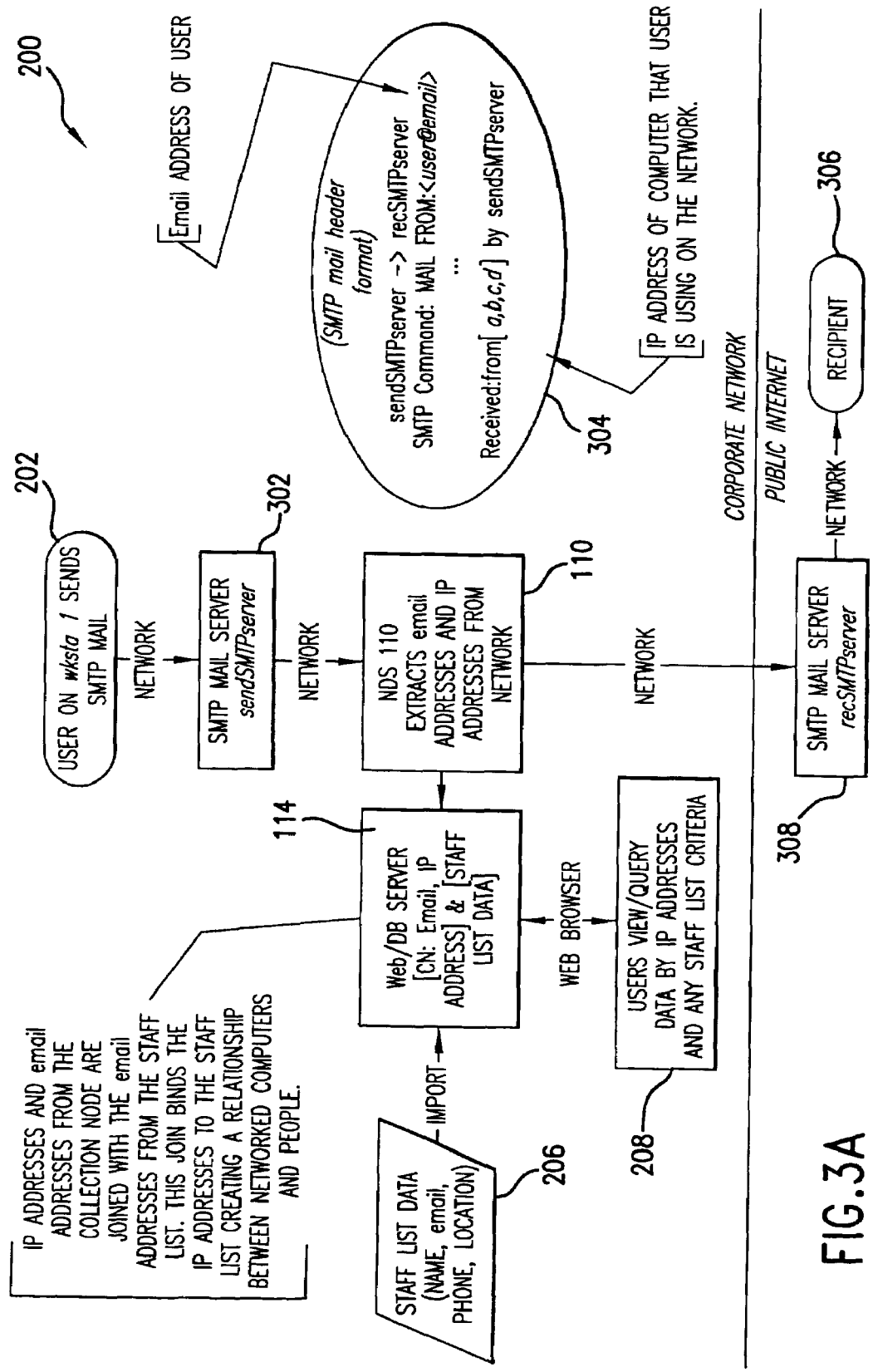

Referring to FIG. 3A, a flowchart illustrating the data flow of network asset tracking process 200 according to one embodiment of the present invention is shown. More specifically, in FIG. 3A, computer 104 users are identified by NDS 110 from SMTP data traffic 202 exchanged between an enterprise's internal (SMTP) mail server 302 and external users 306 accessing outside (e.g., public Internet) SMTP mail servers 308.

Most installations of SMTP servers do not implement data compression or encryption. The initial SMTP greeting will identify the domain from which the e-mail is originating. As seen in FIG. 3A, extracted data 304 (i.e., e-mail traffic data extracted by NDS 110) is analyzed by process 200. The command "MAIL FROM:" will identify the full e-mail address of the sender, and the command "RCPT TO:" will identify the full e-mail address of the recipient. Once NDS 110 extracts data from LAN 102, code logic stored therein is utilized to search for the following patterns to obtain user identifiers:

Command: MAIL
Request parameter: FROM
or:
Command: RCPT
Request parameter: TO:

User identifiers will follow "FROM:" and "TO:" with the identifiers possibly contained with-in "<" and ">" characters. Words after the ";" and before a "<" will usually be some string of the user identifiers. ("FROM:" and "TO:" refer to sender and recipient, respectively.)

Figure 3B:
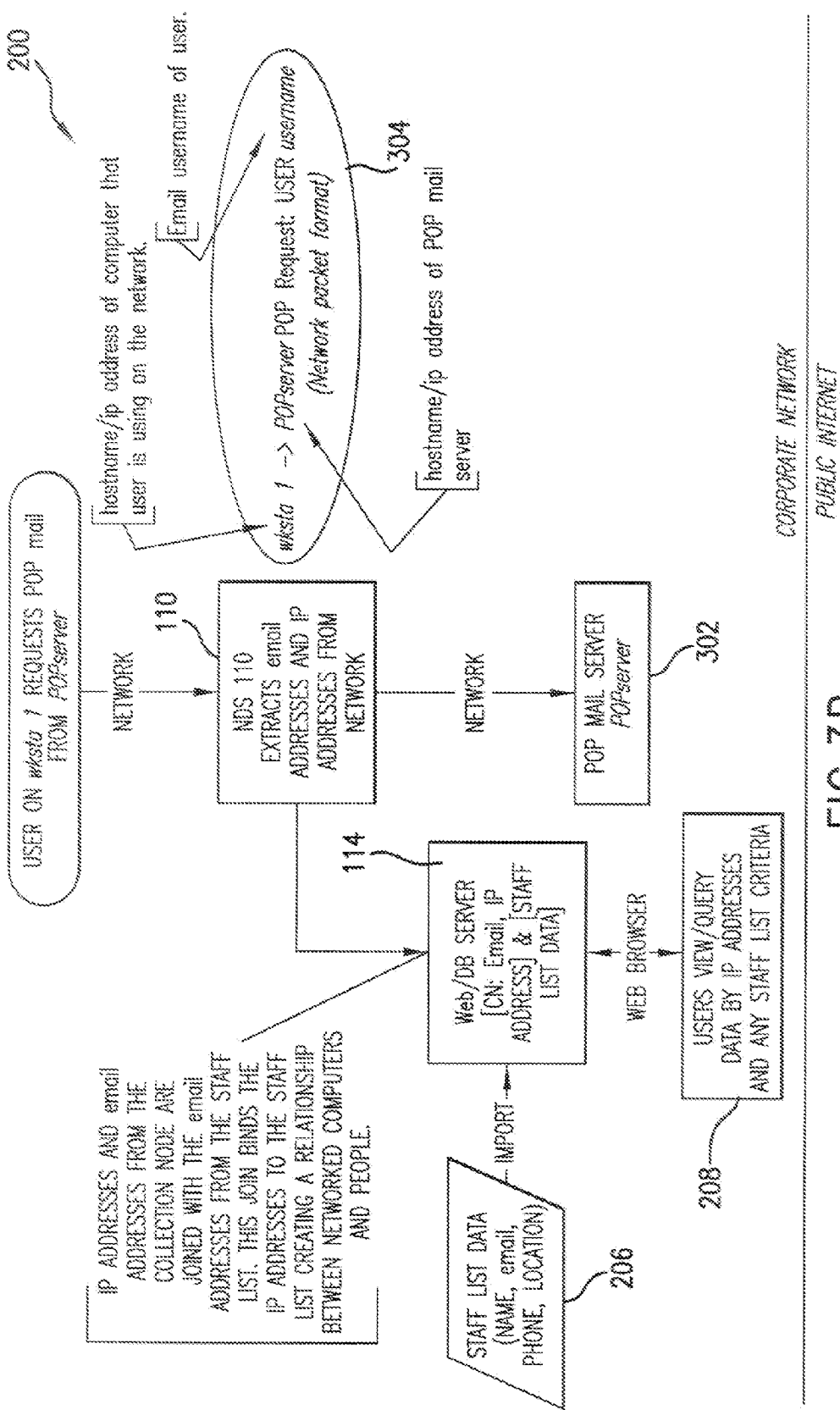

Referring to FIG. 3B, a flowchart illustrating the data flow of network asset tracking process 200 according to one embodiment of the present invention is shown. More specifically, in FIG. 3B, computer 104 users are identified by NDS 110 from POP3 traffic 202 exchanges between an enterprise's internal (POP) mail server 302 and external users accessing outside (e.g., public Internet) mail servers.

The POP3 protocol does not use data encryption or compression. As seen in FIG. 3B, extracted data 304 (i.e., e-mail traffic data extracted by NDS 110) is analyzed by process 200. In POP3, a "USER" command. A "PASS" command will be followed by a space then the user's password in clear (i.e., unencrypted text). A server response of "OK" will confirm the suer's authenticity. Thus, in such an embodiment, a real-time analysis on the POP3 protocol is done using code logic to perform pattern matching for the following:

Request: USER
Request Arg:

"Request Arg:" will be followed by a username string that will identify a user's identity. With this information, the packet header will include source and destination IP addresses to clearly identify the system the user is using. The inventor has found that, generally, less than 64 bytes of data is needed to capture the user's identifier.

Figure 3C:
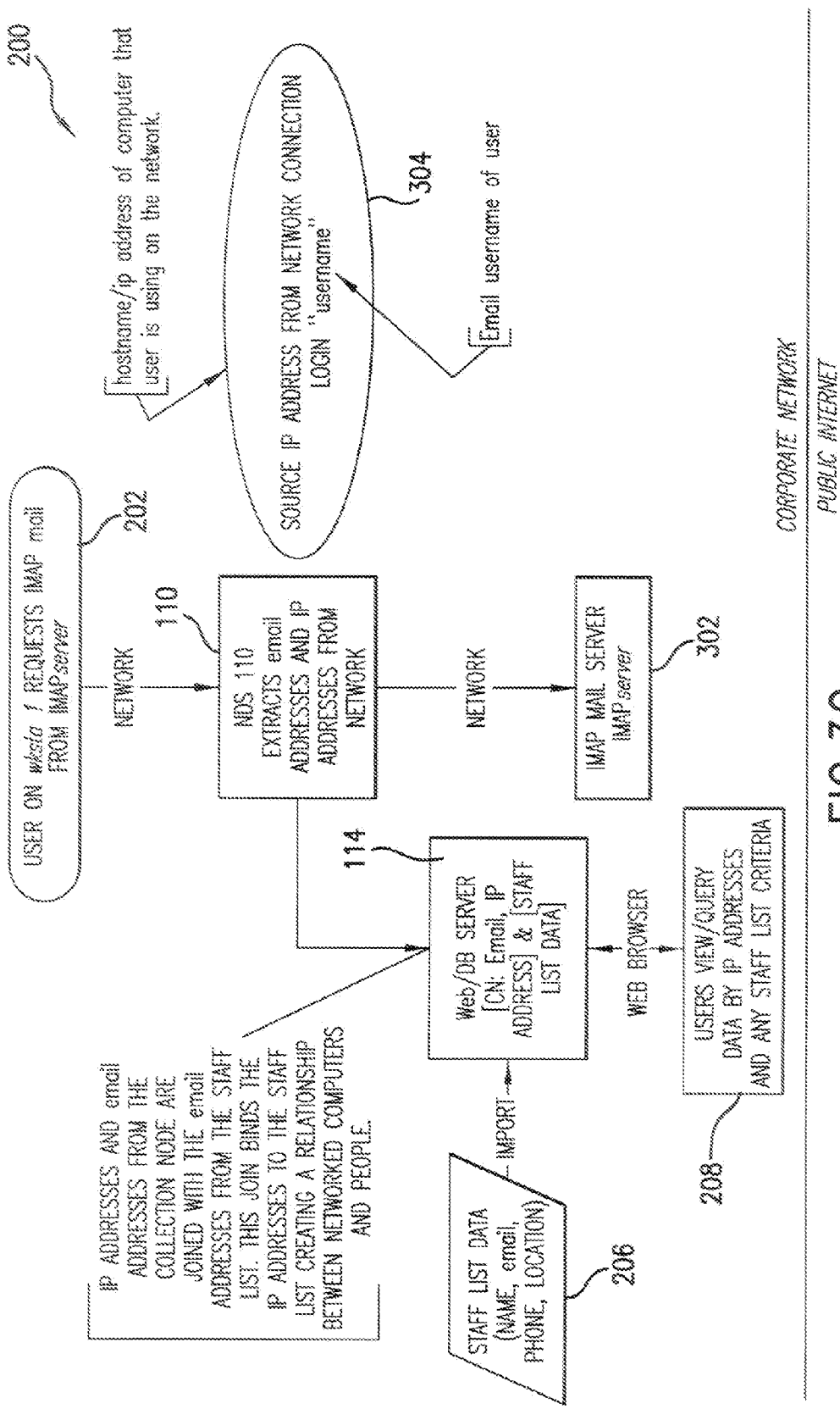

Referring to FIG. 3C, a flowchart illustrating the data flow of network asset tracking process 200 according to one embodiment of the present invention is shown. More specifically, in FIG. 3C, computer 104 users are identified by NDS 110 from MAP traffic 202 exchanged between an enterprise's internal (IMAP) mail server 302 and external users accessing outside (e.g., public Internet) e-mail.

Like POP3, IMAP does not have data encryption or compression by default. As seen in FIG. 3C, extracted data 304 (i.e., e-mail traffic data extracted by NDS 110) is analyzed by process 200. Thus, a pattern match for the string "LOGIN" (case insensitive) will be used to identify a user's identity. After a "LOGIN" command has been issued to the server, a response of "OK LOGIN completed" or "FAIL" will confirm the user's identity. Obtaining a user's username for an IMAP system is similar to that of POP3 by examining for a pattern:

Request Tag: 000A
Request: LOGIN

Following the keyword "LOGIN" will be two arguments (username and password) wrapped in double quotes. Extracting only the necessary information, username, is done at this step. Similar to POP3, the inventor has found that less than 64 bytes of data is needed to be captured to obtain the user identifier. Depending on the client, the LOGIN command is normally within the first five IMAP packets sent.

Figure 3D:
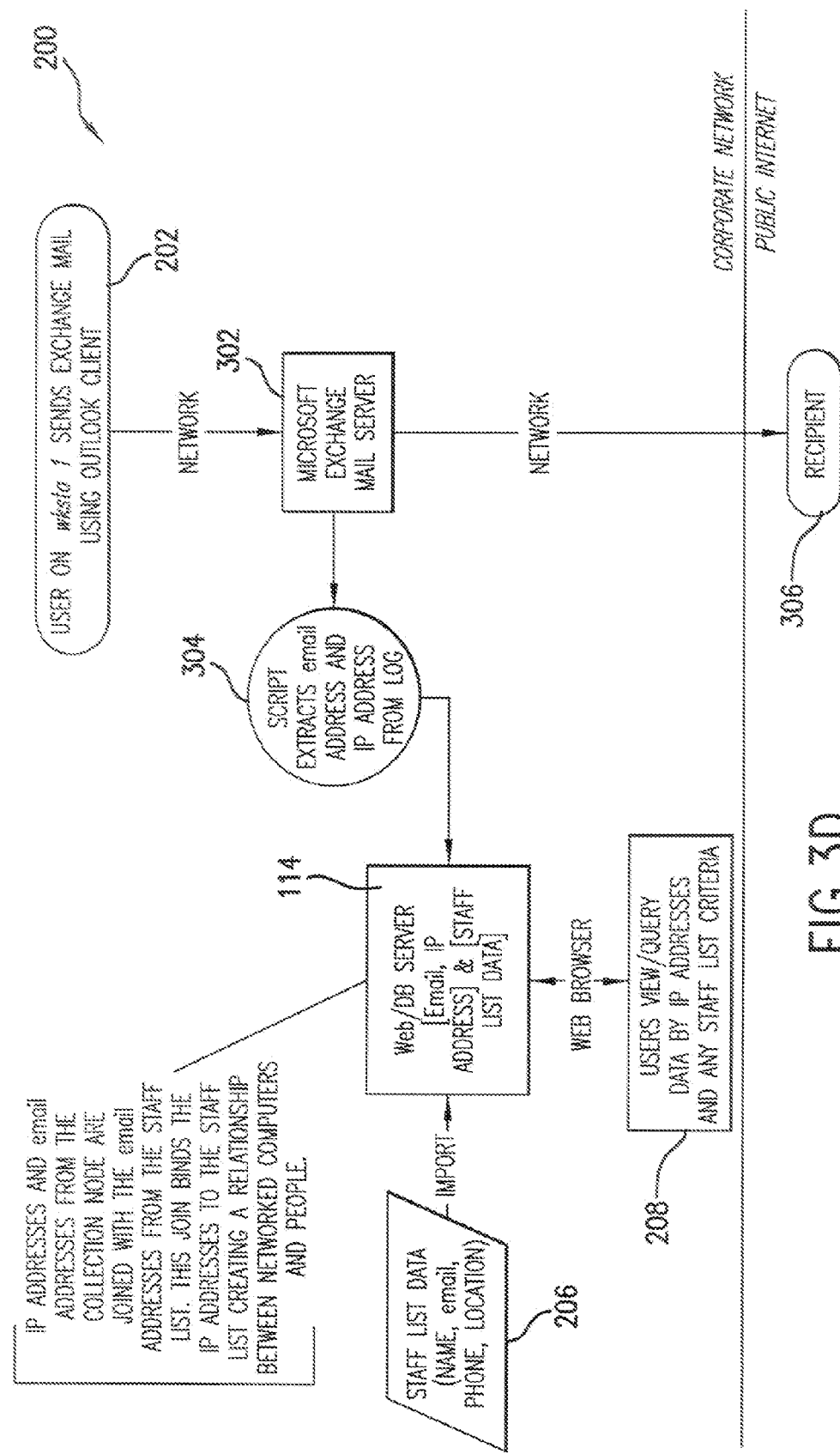

Referring to FIG. 3D, a flowchart illustrating the data flow of network asset tracking process 200 according to one embodiment of the present invention is shown. More specifically, in FIG. 3D, computer 104 users are identified from Microsoft.®™. Exchange e-mail data traffic 202 exchanged between an enterprise's internal (Exchange) mail server 302 and external users 306 accessing outside (e.g., public Internet) e-mail servers (not shown in FIG. 3D).

Microsoft.®™, Exchange Server 2000, and subsequent updates, encrypt traffic between Microsoft.®™. Outlook clients (executing on the client computers 104) and the Exchange mail server 302. Thus, in an alternate embodiment of the present invention, a small script loaded on Exchange server 302 is utilized to obtain extracted data 304. That is, the script is executed at a pre-configured, regular interval, and leverages that Exchange Server 2000 Message Tracking Center (i.e., enabling the message tracking feature on server 302) and its associated tracking log files (e.g., yyyymmdd.txt) which reside on a server 302 share to extract IP and e-mail addresses of senders of e-mail within the network.

In an alternate embodiment, the Microsoft Exchange tracking log files can be remotely accessed using a script that leverages the filesystem object to open the log files and parse them to obtain IP and e-mail addresses of e-mail senders within the network.

In either of the two above-describes embodiments, as seen in FIG. 3D, extracted data 304 can then analyzed by process 200 as explained above. As will be appreciated by those skilled in the relevant art(s) after reading the description herein, the two above-described alternate embodiments leverage Exchange log files and thus allow NDS 110 to remain unutilized in such embodiments.

It should be understood that FIGS. 3A-D, which highlight the functionality and other advantages of NAT system 100, are presented for example purposes only. The architecture of the present invention is sufficiently flexible and configurable such that data collection and processing within NAT system 100 may take place in ways other than that shown in FIGS. 3A-D.

V. Example Implementations

Figure 4:
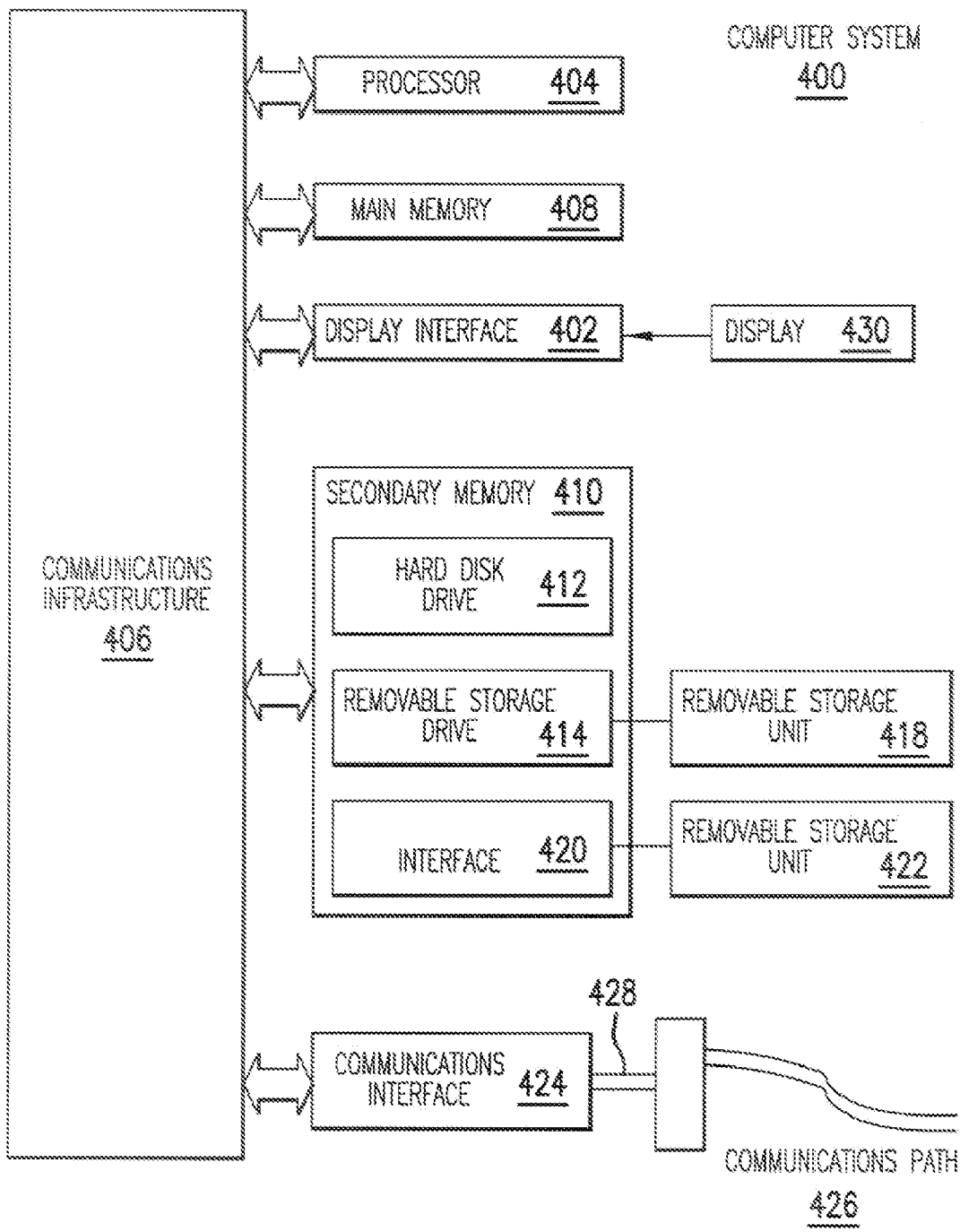
FIG. 4 is a block diagram of an exemplary computer system useful for implementing the present invention.

The present invention (system 100, process 200 or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 400 is shown in FIG. 4. The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stores therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM). or programmable read only memory (PROM)) and associated socket, and other removable storage units 422 and interfaces 420, which allow software and data to be transferred form the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment when the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

What is claimed is:

1. A computerized system for identifying users of Internet Protocol addresses within at least one organization's communications network by matching user identification information from at least one organization's director information with non-encrypted user identification information and current Internet Protocol addresses extracted by at least one discovery apparatus, comprising:

at least one database storing the at least one organization's directory information, the at least one organization's directory information including user identification information but not requiring any list of devices;

at least one discovery apparatus for extracting non-encrypted user identification information and associated Internet Protocol addresses, having at least one connection to at least one switch in the at least one communications network for passively monitoring traffic thru the at least one switch; and at least one server, connected to the at least one discovery apparatus and having access to the at least one database via the at least one communications network, the at least one server capable of matching the extracted non-encrypted user identification information and the user identification information from the at least one organization's directory information as keys to link the extracted Internet Protocol addresses to contacts in the at least one organization's directory information, automatically determining which contacts in the at least one organization's directory information are currently using each of the extracted Internet Protocol addresses.

2. The system of claim 1, wherein the at least one communications network is at least one local area network.

3. The system of claim 2, wherein the at least one local area network is at least one Ethernet network.

4. The system of claim 1, further comprising: at least one central repository, accessible by the at least one discovery apparatus and the at least one Web server, for storing traffic monitored by the at least one discovery apparatus.

5. The system of claim 1, wherein the at least one formatted database contains the following fields of data: (i) First Name and Last Name; and/or (ii) electronic mail address and/or user name.

6. The system of claim 5, wherein the at least one formatted database also contains one of the following fields of data: (i) Middle Initial; (ii) Nick Names; (iii) Name Aliases; (iv) Building; (v) Room; (vi) Permanent E-mail; (vii) Temporary E-mail; or (viii) Affiliation/Organization; or (ix) any combination thereof.

7. The system of claim 1, wherein the user identification information includes at least one electronic mail address, at least one user name, or any combination thereof.

8. A computerized method for identifying users of Internet Protocol addresses within at least one organizations communications network by matching user identification information from at least one organization's directory information with non-encrypted user identification information and current Internet Protocol addresses extracted by at least one discovery apparatus, the method comprising:

monitoring traffic through at least one switch in the at least one communications network;

extracting non-encrypted user identification information and associated Internet Protocol addresses from the monitored traffic;

accessing at least one database of the at least one organization's directory information, the at least one organizations directory information comprising user identification information but not requiring at least one list of devices; and matching the extracted non-encrypted user identification information and the user identification information from the at least one organization's directory information as keys to link extracted Internet Protocol addresses to contacts in the at least one organization's directory information automatically determining which contacts in the at least one organization's directory information are currently using each of the extracted Internet Protocol addresses.

9. The method of claim 8, further comprising:

storing the user identification information and associated Internet Protocol addresses in at least one central repository.

10. The method of claim 9, further comprising: accessing the at least one central repository; and producing a data file, on at least one pre-determined time interval, the data file containing information on which user used which Internet Protocol address during the at least one pre-determined time interval.

11. The method of claim 8, wherein the user identification information includes at least one electronic mail address and/or at least one user name.

12. The method of claim 8, wherein the extracting comprises:

using pattern matching based upon a known electronic mail protocol and/or authentication protocol to extract the non-encrypted user identification information and associated Internet Protocol address from the monitored traffic.

13. The method of claim 8, wherein the at least one local area communications network is at least one Ethernet network.

14. The method of claim 8, wherein the at least one formatted database contains the following fields of data: (i) First Name and Last Name; and (ii) electronic mail address and/or user name.

15. A system for identifying users of Internet Protocol addresses within at least one organization's communications network by matching user identification information from at least one organization's directory information with non-encrypted user identification information and current Internet Protocol addresses extracted by at least one discovery apparatus, comprising:

at least one formatted database storing the at least one organization's directory information, the organization's directory information including user identification information but not requiring any list of devices;

at least one discovery apparatus for extracting non-encrypted user identification information and associated Internet Protocol addresses, having at least one connection to at least one switch in the communications network for passively monitoring traffic through the at least one switch; and at least one Web server, connected to the at least one discovery apparatus and having access to the at least one formatted database via the at least one organization's communications network, the at least one Web server capable of matching the extracted non-encrypted user identification information and the user identification information from the at least one organization's directory information as keys to link the extracted Internet Protocol addresses to contacts in the organization's directory information, automatically determining which contacts in the at least one organization's directory information are currently using each of the extracted Internet Protocol addresses; the at least one Web server also capable of responding to browser-based queries to identify which user is using which computer.

16. A method for identifying users of Internet Protocol addresses within at least one organization's at least one local area communications network by matching user identification information from at least one organization's directory information with non-encrypted user identification information and current Internet Protocol addresses extracted by at least one discovery apparatus, the method comprising:

monitoring traffic through at least one switch in the at least one local area communications network;

extracting non-encrypted user identification information and associated Internet Protocol addresses from the monitored traffic;

accessing at least one formatted database of the at least one organization's directory information, the at least one organization's directory information comprising user' identification information but not requiring any list of devices; and matching the extracted non-encrypted user identification information and the user identification information from the at least one organization's directory information as keys to link extracted Internet Protocol addresses to contacts in the at least one organization's directory information automatically determining which contacts in the at least one organization's directory information are currently using each of the extracted Internet Protocol addresses.

\* \* \* \* \*